US006997388B2

(12) United States Patent
Yogev et al.

(10) Patent No.: US 6,997,388 B2
(45) Date of Patent: Feb. 14, 2006

(54) RADIO FREQUENCY DATA CARRIER AND METHOD AND SYSTEM FOR READING DATA STORED IN THE DATA CARRIER

(75) Inventors: Amnon Yogev, Rehovot (IL); Shlomo Dukler, Tel Aviv (IL)

(73) Assignee: InkSure RF Inc., NY (US)

( * ) Notice: Subject to any disclaimer, the term of this patent is extended or adjusted under 35 U.S.C. 154(b) by 242 days.

(21) Appl. No.: 10/367,678

(22) Filed: Feb. 19, 2003

(65) Prior Publication Data

US 2004/0159708 A1 Aug. 19, 2004

(51) Int. Cl.
*G06K 19/06* (2006.01)

(52) U.S. Cl. ............ 235/492; 235/494; 235/451; 340/551

(58) Field of Classification Search ........ 235/383, 235/385, 492, 451, 494; 340/10.2, 10.32, 340/572.2, 572.4, 572.5, 568.1, 551; 428/458
See application file for complete search history.

(56) References Cited

U.S. PATENT DOCUMENTS

| | | | |
|---|---|---|---|
| 3,620,590 A | 11/1971 | Barker | |
| 4,011,435 A | 3/1977 | Phelps et al. | |
| 4,034,211 A | 7/1977 | Horst et al. | |
| 4,673,932 A * | 6/1987 | Ekchian et al. | 340/10.32 |
| 4,820,006 A | 4/1989 | Constant | |
| 5,001,458 A * | 3/1991 | Tyren et al. | 340/551 |
| 5,151,684 A * | 9/1992 | Johnsen | 340/568.1 |
| 5,291,027 A | 3/1994 | Kita et al. | |
| 5,430,441 A * | 7/1995 | Bickley et al. | 340/10.2 |
| 5,481,102 A * | 1/1996 | Hazelrigg, Jr. | 235/487 |
| 5,557,085 A * | 9/1996 | Tyren et al. | 235/380 |
| 5,563,583 A * | 10/1996 | Brady et al. | 340/572.2 |
| 5,574,470 A | 11/1996 | De Vall | |
| 5,604,485 A * | 2/1997 | Lauro et al. | 340/572.5 |
| 5,625,341 A | 4/1997 | Giles et al. | |
| 5,682,143 A | 10/1997 | Brady et al. | |
| 5,694,229 A | 12/1997 | Drinkwater et al. | |
| 5,811,775 A | 9/1998 | Lee et al. | |
| 5,900,954 A | 5/1999 | Katz et al. | |
| 5,995,006 A | 11/1999 | Walsh | |
| 6,100,804 A | 8/2000 | Brady et al. | |
| 6,104,311 A | 8/2000 | Lastinger | |
| 6,304,169 B1 | 10/2001 | Blama et al. | |
| 6,346,884 B1 | 2/2002 | Uozumi et al. | |
| 6,424,263 B1 | 7/2002 | Lee et al. | |
| 6,441,740 B1 | 8/2002 | Brady et al. | |
| 6,458,465 B1 * | 10/2002 | Uchibori | 428/458 |
| 6,693,540 B1 * | 2/2004 | Gershenfeld et al. | 340/572.4 |
| 6,732,923 B1 * | 5/2004 | Otto | 235/383 |
| 6,827,281 B1 * | 12/2004 | Edmonson et al. | 235/492 |
| 2003/0111540 A1 * | 6/2003 | Hartmann | 235/492 |
| 2004/0075560 A1 * | 4/2004 | Hartmann et al. | 340/572.1 |

OTHER PUBLICATIONS

Savi Technology; " Active and Passive RFID: Two Distinct, But Complementary, Technologies for Real-Time Supply Chain Visibility"; Jan. 2002; www.savi.com/solutions/whitepapers/RFID_whitepaper.pdf.

(Continued)

*Primary Examiner*—Jared J. Fureman
(74) *Attorney, Agent, or Firm*—Oliff & Berridge, PLC (57) ABSTRACT

A radio frequency (RF) data carrier is presented. The RF data carrier comprises at least one diffraction element that has a dimension of the order of a wavelength of RF radiation and is responsive to RF irradiation, the response produced by the diffraction elements in the data carrier being indicative of machine-readable data carried by data carrier.

38 Claims, 5 Drawing Sheets

OTHER PUBLICATIONS

Checkpoint Systems, Inc.; "Expresstrak Chipless RFID, Increase Consumer Convenience With Expresstrak Chipless RFID"; 2002; www.checkpointsystems.com/downloads/pdf/es105.pdf, no month available.

Checkpoint Systems, Inc.; " Expresstrak Chipless RFID, Enhance POS Operations With Express Trak Chipless RFID"; 2002; www.checkpointsystems.com/downloads/pdf/es102.pdf, no month available.

Z. Nazarchuk et al., "Problem of Plane Electromagnetic Wave Diffraction by Multielement Grating Imbedded in a Half-Space", *Conference Proceedings 2000 International Conference on Mathematical Methods in Electromagnetic Theory*, vol. 2, pp. 563-565, Sep. 12, 2000.

T. Lee et al., "Diffraction Pattern by a Trapezoidal Cylindrical Cavity", *Journal of the Korean Institute of Telematics and Electronics*, pp. 1346-1349, May 7, 1990.

K. Sarabandi et al., "Radio Wave Diffraction from Impedance Surfaces with One Dimensional General Impedance Variation", *Antennas and Propagation Society International Symposium*, pp. 2156-2159, Jun. 21, 1998.

* cited by examiner

RADIO FREQUENCY DATA CARRIER AND METHOD AND SYSTEM FOR READING DATA STORED IN THE DATA CARRIER

FIELD OF THE INVENTION

This invention is generally in the field of article-identification and authentication, and relates to an RF data carrier, and a method and system for reading information stored in such a data carrier.

BACKGROUND OF THE INVENTION

Electronic Article Surveillance (EAS) systems are widely used to detect the presence of small electronic labels placed on or in an article or carried by a person of interest, and can, for example, be used in retail or library environments to deter theft or any other unauthorized removal of articles. In particular, the EAS labels are attached to articles designated to either be purchased or borrowed, and when active, will trigger an alarm if carried without authorization through interrogation zones typically located at the store or library exits.

There are many applications when it is also desired to know more information than just whether a tagged object is present. For example, very often users also want to know which tagged article is present. In this connection, information-carrying tags are widely used both for the identification of products and security purposes, as well as product authentication. These information tags are able to carry a sufficient number of bits regarding the characteristics of articles to provide useful information, such as the product's name, date of manufacture, price, and whether the product, article or person has properly passed through a check-out counter or kiosk, etc. As used herein, the terms "information carriers", "marks", "markers", "labels" and "tags" are used interchangeably and refer to the devices used to carry multi-bit data therein.

The most popular example of the information-carrying multi-bit tags is a printed optical barcode. While inexpensive and effective, the optical bar code system, however, has certain limitations, for example, the "words" utilized in coding the bar code, have a relatively long length due to their binary nature. In fact, these words consist of a plurality of two ordinal symbols ("0" or "1") allocated for each bit and represented by the presence or absence of the barcode's lines.

Various examples of multi-bit markers are known in the art, which can employ more than two symbols for encoding information therein. One known kind of such markers utilizes selected combinations of multiple different diffraction gratings as a means for forming indicia, e.g., marking price, inventory number and the like.

For example, U.S. Pat. No. 4,011,435 to Phelps et al. describes an optical marking system which utilizes tags that are formed from multiple diffraction gratings. Each of the gratings differs from the others in orientation and number of lines (spatial frequency), in accordance with the coded information desired on the tags. The concept of coding is based on the diffraction patterns obtained when combinations of gratings with pre-selected orientations and number of lines are illuminated with coherent light. A specific coding is thus represented by a specific arrangement of images in the diffraction part; the images in turn are associated with the angular orientations and spatial frequencies of the gratings. A unique group of images in the diffraction pattern may represent a unique group of information bits.

U.S. Pat No. 4,034,211 to Horst et al. describes, inter alia, an optical identification system using a line of several different, quite discrete and distinct optical gratings which are imbedded in a predetermined or within the construction of a credit card. Optical gratings (each being characteristic of a code value) consist of a number of parallel straight lines at a given spacing across a surface. The lines may exist in the form of opaque printed lines, transparent slots, reflective bars or lines cut into the surface of an object. Optical gratings can be illuminated by a monocromatic beam of light to cause diffraction. The diffracted rays can be detected by a photodetector placed at a precisely determined location. The presence or absence of a particular grating will therefore produce a digital-type electrical signal from the associated photodetector.

U.S. Pat. No. 5,291,027 to Kita et al. describes an identification mark having a plurality of mark elements. At least two different diffraction gratings (having different directions and/or different spatial frequencies) can be drawn in each mark element of the identification mark so that a pattern having a binary character is formed. Each mark element is divided into a large number of first and second square fine regions, which are alternatively arranged. The first grating is formed in only the first fine regions, and the second gang is formed in only the second fine regions. When desired, the number of types of diffraction grating patterns which one mark element can produce can be increased. Therefore, the information volume, which can be carried by the identification mark can also be increased.

U.S. Pat. No. 5,811,775 to Lee describes an optical data element that includes a plurality of diffraction zones wherein each zone contains a multiplicity of diffraction gratings. The diffraction gratings can define diffraction grating pixels which for the respective diffraction zones are chosen from a palette of pixel grating functions. A simple palette can comprise a range of straight line grating functions having varying grayscale values. For example, the palette comprising 16 different functions and corresponding grayscale values can define 16 element palette from palette element K to palette element Z, uniformly varying in steps from near white to substantially black. Each of these grating pixels, when illuminated, will generate a first order diffracted beam whose divergence angle increases from palette element Z to palette element K. If a detector is placed at a given distance in front of the grating to detect this first order beam, the intensity recorded at the detector will likewise decrease in a stepped scale from palette element Z to palette element K.

Despite the extensive prior art existing in the area of multi-bit information carriers based on barcodes and optical diffraction gratings, there are certain disadvantages associated with the utilization of such devices. One of the main drawbacks of the techniques based on the use of bar codes and optical diffraction gratings is related to the fact that the bar codes and optical diffraction gratings must be visible, which limits the locations in which they may be placed. Thus, bar codes and optical diffraction gratings can easily be obscured, either accidentally or intentionally. The visible barcodes and optical diffraction gratings can be easily duplicated. Therefore, as soon as a counterfeiter learns the method of duplication, the barcodes and optical diffraction gratings become worthless for authentication purposes. Moreover, because barcodes and optical diffraction gratings are exposed to ambient medium, the barcodes and optical diffraction gratings are susceptible to damage that can result in detection failures. Usually, the ranges at which detectors can sense bar codes and optic diffraction patterns are also comparatively small. The bar codes and optical diffraction gratings should also be appropriately positioned for radiation and detection. Therefore, the barcodes and optical gratings cannot be placed beyond the line of sight of the detecting device. Last, but not least, the disadvantage is also associated with the fact that multiple items utilizing the barcodes and optical diffraction gratings must be scanned (read) one at a time. These constraints of bar code systems and optical diffraction gratings make them undesirable or inefficient for some applications.

Another technique of electronic item identification is based on the use of a Radio Frequency (RF). RF tags have been developed and are disclosed, for example, in the following publications: U.S. Pat. Nos. 5,574,470 to de Vall; 5,625,341 to Giles et al.; 5,682,143 to Brady et al; 5,995,006 to Walsh; 6,100,804 to Brady et al.; 6,346,884 to Uozumi et al; 6,424,263 to Lee et al; 6,441,740 to Brady et al. Such information carrying tags are responsive to a coded RF signal received from a base station.

Generally, RF tags can be active (utilizing an internal energy source incorporated with the tag) or passive, that functions using the energy of an external interrogation signal and are dependant on energy supplied from a tag reader or an external device. The RF tag typically includes an antenna attached to a resonance circuit which is energized by the received interrogation signal and which, when energized, excites the antenna to transmit a response radio frequency signal. The antennas used in an RF ID tag are generally constituted by loops of wire or metal, etched or plated on the tag surface.

The particulars and advantageous features of active and passive RF tags are known.

http://www.savi.com/solutions/whitepapers/RFID_whitepaper pdf.

RF tags may have various code or memory configurations. The simplest example is the single-code tag typically utilized in EAS systems. These tags emit a single response when activated by a reader. The response is a simple yes or no, indicating whether or not the tag is present or activated. Other tags respond with a code including a preset serial number. It is also known to provide a plurality of resonant circuits on an RF ID tag, each resonant circuit configured with the tag to output a response signal at a predetermined frequency in response to a query signal. The number of possible different responses is determined by the number of individual circuits and/or the ability to time sequence the responses from the circuit.

For example, U.S. Pat. No. 6,104,311 to Lastinger describes an RF identification tag comprising a substrate, an input mechanism disposed on the substrate and configured to receive a query signal, and an output mechanism disposed on the substrate. The tag includes a response circuitry disposed on the substrate in operative communication with the input/output mechanism which can be one or more antennas configured to receive and transmit signals at a predetermined frequency. The response circuitry includes one or more code circuits, each configured to output a unique response code. A connection between any given code circuit and a given antenna determines the response code and frequency at which that response code will be generated and output in the response signal. The selective connection of the code circuits and the antennas determines the response code/frequency combinations that comprise the response signal.

Another tag which uses radio frequency waves transmitted from a scanning device in order to identify an item to which the tag is attached is described in U.S. Pat. No. 6,304,169 to Blama. The tag includes a first insulating layer having a top surface and a bottom surface, and resonant circuits formed on the first insulating layer. Each of the resonant circuits are formed on either the top surface or the bottom surface of the first insulating layer and have a resonant frequency associated therewith. Each of the resonant circuits includes a resonance circuit (capacitance and inductance elements). The tag is associated with a binary number established by a pattern of ones and zeros depending on each circuit resonance or non-resonance, respectively.

The developments in the RF tag technology are aimed at creating the so-called chipless RFID tags (utilizing a printing technique rather than the integrated technology), such as is known.

http:/www.checkpointsystems.com/downloads/pdf/es105pdf http:/www.checkpointsystems.com/downloads/pdf/es102pdf

SUMMARY OF THE INVENTION

Thus, there is a need in the art for, and it would be useful to have, a passive RF data carrier that enables enhanced information density, is free of bulky electronic components, and can be read at no line of sight between the tag and a reading head and over an obstacle.

The term "passive RF tag" used herein signifies a tag that does not generate any energy, but only responds to exciting radiation by transmitting, reflecting or scattering it, and that has no active elements of a logic scheme.

The RF tag of the present invention comprises a substrate layer patterned to define one or more diffraction elements having a dimension of the order of a wavelength of RF electromagnetic radiation. The pattern is formed by spaced-apart regions having different properties with respect to RF radiation, as compared to those of the spaces between these regions (i.e., of the substrate layer).

When an object is illuminated by electromagnetic radiation with a wavelength in the order of magnitude of the dimension of the object, the real image of the object is not obtained. The electromagnetic waves strongly interfere, producing a new pattern. The relationship between the shape of a simple object and the resulting pattern can be calculated so that every specific object can be expressed by the diffraction pattern.

According to the invention, the diffraction patterns are read and their pictures are recorded, instead of the pictures of objects. Since the patterns have an angular structure, the position of the origin can be traced back even behind an obstacle, minimizing the effect of "collision" between different objects. In other words, the process of reading the data carrier of the present invention is not prevented, even if the carrier is placed beyond the line of sight. This feature provides an opportunity to read several carries at the same time.

According to the invention, diffraction patterns formed from the diffraction elements define symbols in a data marking information code ("language"). Such language, based on these symbols, is formed from "words" based on a combination of the symbols. A position of each diffraction element in the data carrier represents an information bit.

According to one aspect of the present invention, there is provided a radio frequency (RF) data carrier comprising at least one diffraction element, having a dimension of the order of a wavelength of RF radiation and being responsive to RF irradiation, said response being indicative of machine-readable data carried by the tag.

The diffraction element is made of a material capable of absorbing, scattering or reflecting the RF radiation, and has a dimension of above 0.1 mm.

The RF data carrier may comprise a collection (set) of the diffraction elements producing together a collection of diffraction patterns in response to the RF irradiation, each pattern defining a symbol of the information code store din the data carrier. The diffraction elements may be different from each other in either shape or dimension, thereby enabling identification of the diffraction pattern of one element from those of the others. Non-limiting examples of the diffraction elements include a vertical slit, horizontal slit, circular slit, oval ring, multiple slits, etc. Each of the diffraction elements is capable of producing a diffraction pattern when irradiated with selected frequency electromagnetic radiation.

The diffraction element(s) made of materials(s) having specific RF absorption, reflection or scattering properties different from that of a substrate material may be deposited on the substrate surface, for example by printing, such as laser printing, ink jet printing, thermal transfer, letter press, offset printing, gravure printing, screen printing, etc. The diffraction element(s) may be incorporated in the structure of an article with which the data carrier is associated.

The RF data carrier may also comprise a layer opaque to visible light and disposed over all the diffraction elements in the data carrier. For example, the cover layer can be opaque (or black) in the visible light while transparent or permeable to electromagnetic radiation in RF wavelength spectrum that is invisible to the human naked eye. The data marking defined by the diffraction elements is thus camouflaged from a counterfeiter.

The RF data carrier way include an additional substrate surface carrying at least one additional diffraction element. These two substrate surfaces may be the opposite surfaces of a common substrate layer. In this case, the substrate may be made of a material which is impermeable to the RF radiation of a first predetermined wavelength band used for reading the diffraction element on one surface, while being transparent to a second predetermined wavelength band of the RF spectrum used for reading the diffraction elements on the second surface, or vice versa. Such a data carrier, having several substrate surfaces (or layers) with diffraction elements, can be employed to increase the capacity of the stored data. For example, in a double layer data carrier, information can be recorded by using the diffraction elements in the upper substrate layer using a material, which is reactive to a specific wavelength and transparent to a second wavelength that reacts with the lower substrate layer. Such combinations of additional substrate layers and diffraction elements can form multiple substrate layer data carriers.

The diffraction element may be an interference pattern of RF radiation. This interference pattern may be created by computer-generated holography based technique, and may be printed on a substrate layer.

According to another aspect of the present invention, there is provided a system for reading data in at least one RF data carrier, which comprises at least one diffraction element having a dimension of the order of a wavelength of RF electromagnetic radiation and producing a response to RF radiation indicative of data stored in the data carrier, the system comprising:

at least one RF radiation source for generating RF radiation to irradiate the RF data carrier; and a detector responsive to diffraction patterns produced by the diffraction elements for generating signals indicative of the diffraction patterns to be converted into corresponding information codes.

The detector may include one or more sensors configured for receiving RF radiation and generating a signal indicative thereof. The sensor may be an area sensor including an array of sensing elements. The configuration may be such that at least one of the sensor, RF radiation source and data carrier is mounted for movement with respect to the other. Alternatively, the detector may include a plurality of sensors mounted around a location where the RF data carrier is to be placed when being read.

According to yet another aspect of the present invention, there is provided a method of reading data stored in at least one RF data carrier, which comprises at least one diffraction element having a dimension of the order of a wavelength of RF radiation producing a response to RF radiation indicative of information code stored in the data carrier the method comprising:

(i) irradiating the data carrier with the RF radiation, thereby producing said response in the form of diffraction patterns;

(ii) sensing said diffraction patterns and generating signals indicative thereof; and (iii) converting said signals into corresponding information code, thereby determining said data from the diffraction patterns.

The converting of the diffraction patterns into the information code according to the present invention is performed on the basis of an appropriate image recognition algorithm establishing a relationship between the diffraction patterns and symbols of the information code.

According to yet another aspect of the present invention, there is provided a method of simultaneously reading data stored in a plurality of RF data carriers, each comprising at least one diffraction element having a dimension of the order of a wavelength of RF radiation and producing a response to the RF radiation in the form of a diffraction pattern indicative of a symbol of an information code, the method comprising:

(i) simultaneously irradiating the RF data carriers with the RF to produce the diffraction patterns;

(ii) sensing said diffraction patterns and generating signals indicative thereof; and (iii) converting said signals into the corresponding information code, thereby determining said data from said diffraction patterns.

The data reading may utilize a relative displacement between the sensor and/or RF radiation source and the data carrier, or may utilize a plurality of sensors mounted around the RF data carriers location. Preferably, a relative displacement between the sensor and multiple-tag site is used (the so-called "zoom scanning") to enable identification of one tag from the others. Such an identification can additionally or alternatively be implemented by scanning the RF frequency range.

The information-carrying tag (e.g., multi-bit tag) of the present invention has advantageous features. In particular, there is no strict requirement for the data carrier of the invention to be appropriately positioned for radiation and detection. The diffraction elements associated with the data carrier can produce a collection of diffraction patterns having an angular structure under irradiation with RF electromagnetic radiation. Since the pattern has an angular structure, the position of the origin can be traced back even behind an obstacle, minimizing the effect of "collision"

between different objects. In other words, the process of reading the data carrier of the present invention is not prevented, even if the carrier is placed beyond the line of sight of the detecting device. This feature provides an opportunity to read several carriers at the same time. The RF radiation utilized for irradiating the data carrier of the invention can readily penetrate into the environment of detection that provides the possibility for the user to read the tag at no line of sight between the tag and reading head. The data carrier of the invention can have the advantage that a viewer can not, without aid, see the hidden data marking that can be concealed under an opaque (or black) layer. This makes forgery difficult. On the other hand, appropriate scanning devices can readily detect the data makings. The multi-bit data carrier according to the present invention may be of rather high information density. The data carrier according to the present invention may be easily and efficiently manufactured and marketed, is of durable and reliable construction, and may have low manufacturing cost.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The principles and operation of the information-carrying multi-bit data carrier and identification system according to the present invention may be better understood with reference to the drawings and the accompanying description, it being understood that these drawings and examples in the description are given for illustrative purposes only and are not meant to be limiting. The same reference numerals will be utilized for identifying those components which are common in the multi-bit data carriers shown in the drawings throughout the present description of the invention.

Figure 1A:
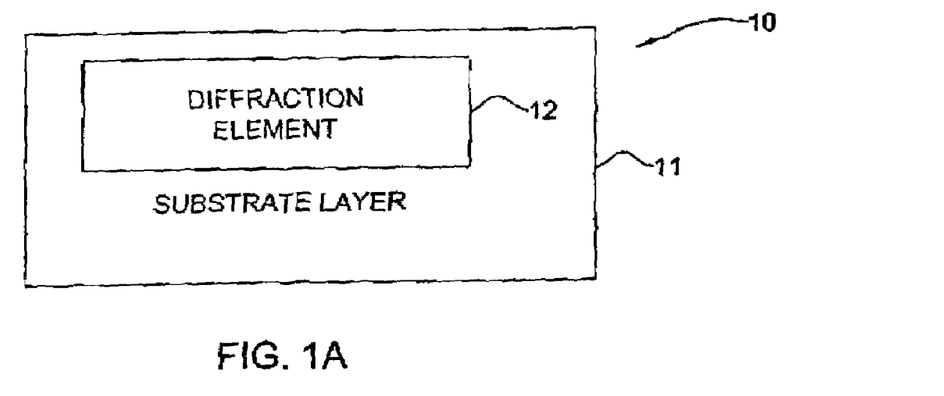
FIG. 1A is a schematic plan view of a data carrier, according to one embodiment of the invention.

Referring now to the drawings, FIG. 1A illustrates a data carrier 10 according to one embodiment of the invention.

The data carrier 10 comprises a substrate layer 11 whose surface is patterned to have a diffraction element 12. It should be noted that the relative size and position of the diffraction element 12 are shown in FIG. 1 only as a non-limiting example, and are not drawn to scale. The element 12 has a dimension of the order of a wavelength of RF electromagnetic radiation (above 0.1 mm, considering that the RF frequency range is $10^4$–$10^{12}$ Hz) and is indicative of machine-readable data carried by the tag. According to the invention, radio frequency (RF) electromagnetic radiation is utilized for irradiating the diffraction element 12. For example, the RF continuous wave of a selected frequency band (or more than one frequency band, as the case may be) is used for irradiating the data carrier of the present invention. According to another example, a train of relatively short pulses of RF radiation is used for irradiating the data carrier. The element 12 can be dimensioned in accordance with a predetermined RF frequency, or an array of such elements of different shapes and/or different dimensions can be used in the tag, as will be described further below. In this connection, it should be understood that the shorter the pulse, the wider the frequency range is contained therein. This allows for coding the tag by using multiple diffraction elements of different dimensions and for the simultaneous reading of these multiple elements. Moreover, the use of pulses provides for better signal to noise ratio (SNR) as compared to that of continuous waves, owing to easier synchronization between the RF transmitter and receiver. The SNR can be even more improved by using short pulses. It should be noted that the selection of the RF wavelength, inter alia, depends on the absorption profile of materials that can be used for the data carrier, and the possibility to penetrate the environment of detection.

It should be noted that comparing the technique of the present invention to an imaging optics, which does not allow an interference effect to occur, the information density can be increased. For example, with the imaging optics, a square label having a side length of 10 centimeters allows for incorporating therein only 100 bits of information that can be read with the wavelength of several millimeters without the interference between two locally adjacent bits. The limit to the density of information is associated with the fact that as long as the imaging optics is used (i.e., interference is not allowed), the dimension of the data elements must be significantly larger than the wavelength of reading radiation. Another limitation of the imaging technique is the difficulty to recognize different elements in the case when there is a need to recognize a sample with a multitude of elements casting their shadows on one another and causing the effect which is referred to as a "collision" of elements.

If the tag has a dimension of the order of a wavelength of the RF radiation, the simple imaging optics' rules do not hold, since the waves of RF radiation will interact, causing interference and diffraction. When interference is allowed, a significantly higher density of information can be stored in the tag, in particular, the maximum linear density of the recordable information can be 1 bit per the length equal to the wavelength λ (for each dimension of the element). For example, for a square label having a side length of 10 centimeters, when using radiation having a one-millimeter wavelength, the two-dimensional maximal recorded binary information can be 10000 bits.

When the tag of the present invention is illuminated by RF radiation (with a wavelength in the order of magnitude of the dimension of the diffraction element 12), the real image of the tag is not obtained, because of the interference effect producing a diffraction pattern. The tag, however, can be expressed by the diffraction pattern by calculating the relationship between the shape of the diffraction element(s) and the resulting pattern. In this way, it is possible to read and record pictures of diffraction patterns.

Moreover, since the RF pattern has an angular structure, the position of the diffraction element can be traced back even behind an obstacle, minimizing the effect of "collision" between different objects. In other words, the process of reading the data carrier of the present invention is not prevented, even if the data carrier is placed beyond the line of sight and over an obstacle. This feature provides an opportunity to read several data carriers at the same time. As was mentioned above, this is not possible in the case of barcodes and optic gratings.

Figure 2A:
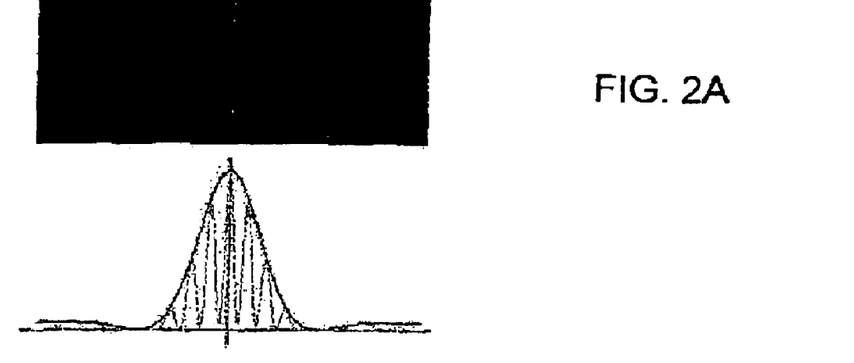
FIGS. 2A to 2C illustrates diffraction patterns emerging from a double slit obtained at various distances from the double slit.
Figure 2B:
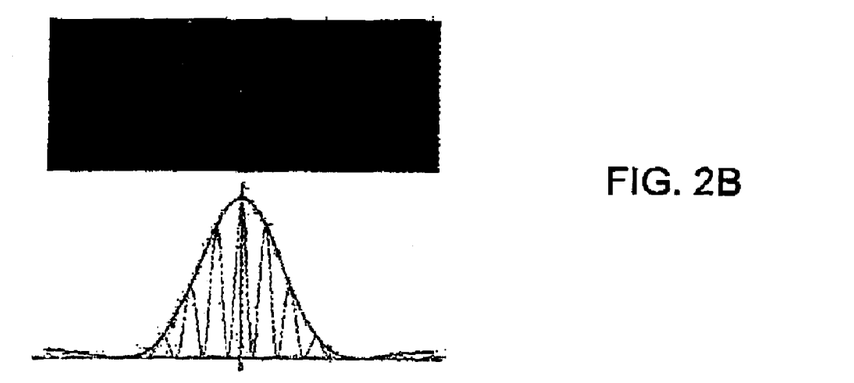
Figure 2C:
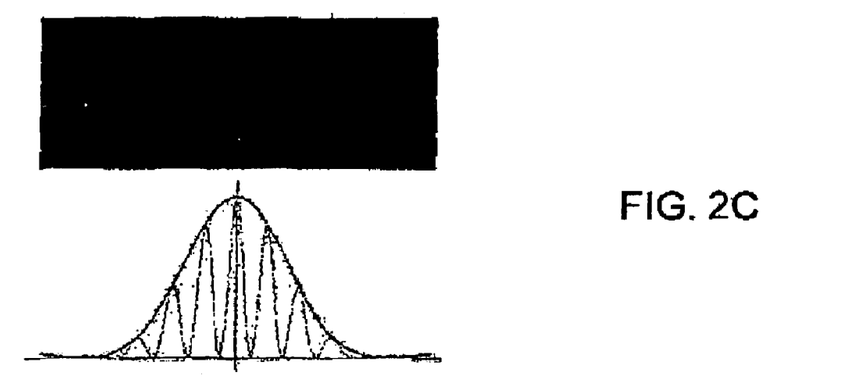

FIG. 2A through FIG. 2C illustrate the diffraction pattern in radiation emerging from a back-irradiated double slit varies as the distance from the slit increases. As can be seen, the distance between the diffraction fringes increases when the distance from the slit increases, demonstrating the option to trace back the position of the slit (i.e., tag) and thereby handle the problem of collision.

Thus, the present invention, utilizing the dimension of the diffraction elements 12 and the RF wavelength of reading radiation of the same order of magnitude, provides for the simultaneous reading of data stored in a plurality of such data carriers, with no need for line-of-sight arrangement of the reader with respect to the data carrier.

According to one embodiment of the invention, the diffraction element 12 is an interference pattern of RF radiation. The RF interference pattern can carry data to be stored in the tag in a fashion similar to that of the typical optic holographic interference pattern (see, for example, U.S. Pat. Nos. 3,620,590; 4,820,006; 5,694,229 and 5,900,954). Thus, upon irradiation of the interference pattern with a source similar to the recording source, the data encoded in the data carrier can be retrieved. Moreover, when required, the image of the tag encoded in the RF interference pattern can be reconstructed.

The tag can be encoded by using object and reference beams similar to the optical holography. The principles of optical holography are known per se and therefore need not be specifically described except to note the following. When an image of an original object is recorded after being illuminated by two laser beams originating from the same source, then the so-obtained recorded pattern is an interference pattern having no resemblance to the original object. An image of the original object can be reconstructed after illumination with a similar laser source. Since the interference pattern that obtained during recording is based on the phase difference of both laser beams on the recording material the three-dimensional image of the object or any data encoded therein can be recorded. Upon reconstruction, by illuminating with a similar laser, the three-dimensional object or data can be retrieved. It should be noted that since the recording method is based on the interference phenomenon, the upper limit of the density of information depends on the wavelength, and, for three-dimensional recording, is defined as $1/\lambda$ for each dimension.

Contrary to the optical holography, the present invention can utilize a computer-generated technique for the data recording in a tag based on the simulation and generation of holograms computationally using a printing technique. This is due to the fact that the tag of the present invention is formed by one or more diffraction elements, each being of a size of the RF wavelength, which is within the resolution of the existing printers. A mathematical description of the object (e.g., a digit image) is utilized for creating an interference pattern, instead of the real object. After the computation of the hologram image, the interference pattern can be printed on the tag substrate. Examples of the printing technique include, but are not limited to, laser printing, ink jet printing, thermal transfer, letter press, offset printing, gravure printing, screen printing, etc.

Figure 1B:
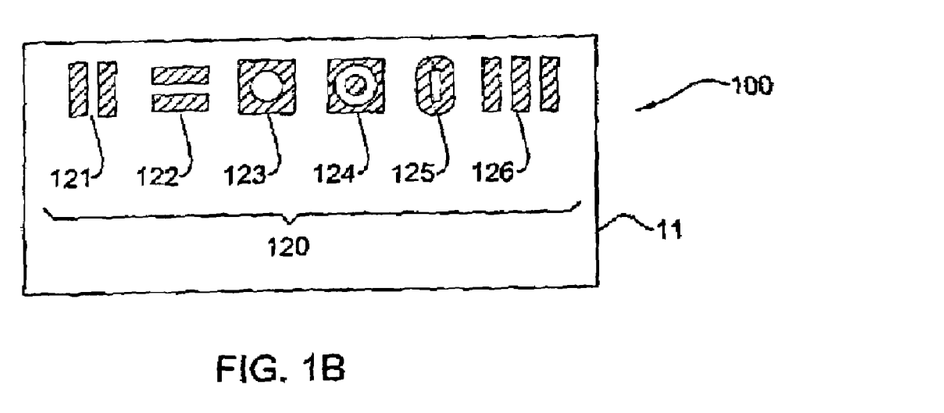
FIG. 1B is a schematic plan view of a data carrier and examples of diffraction elements utilized therein, according to another embodiment of the invention.

Referring to FIG. 1B a plan view of a multi-bit data carrier 100 according to another embodiment of the invention is illustrated. The data carrier 100 comprises a substrate layer 11 on which a plurality of diffraction elements 120 is arranged. In the present example, the plurality of diffraction elements 120 include a oriented double-strip element (defining a functional "slit" therebetween) 121, a horizontally oriented double-strip element 122, an apertured rectangular element (defining a circular slit) 123, a somewhat different apertured rectangular element (defining a ring-like slit) 124, an oval-like ring 125, and a triple-strip element (defining a double-slit structure) 126. It should, however, be noted that the technique of the present invention is not limited to any specific shape or size of the diffraction element, provided its size is in the range of RF wavelengths. Each of the diffraction elements is capable of producing a diffraction pattern when irradiated with RF radiation of a selected frequency depending on the size of the diffraction element. The diffraction patterns produced by each of these elements are similar to those generally known in the art of optics, and therefore need not be specifically described and illustrated.

Figure 1C:
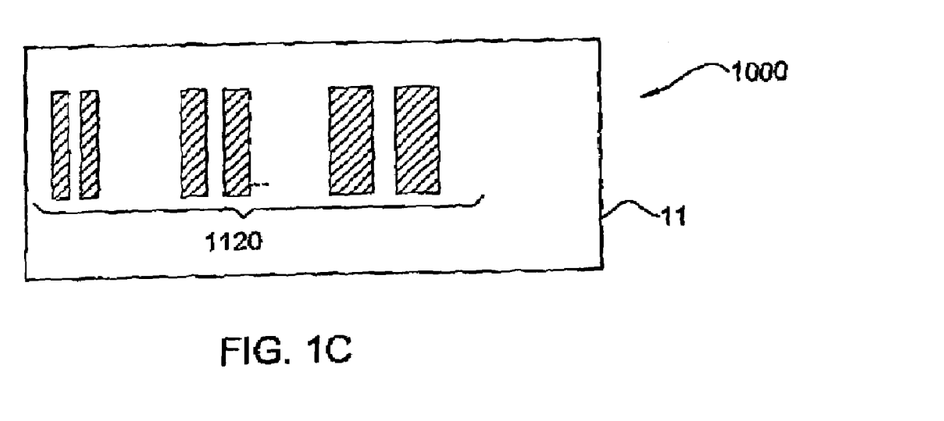
FIG. 1C illustrates a data carrier according to yet another embodiment of the invention.

FIG. 1C illustrates yet another embodiment of the invented tag 1000. Here, in distinction to the previously described example, diffraction elements 1120 are of a similar shape (e.g., vertically oriented double-strip) but different sizes are used. To read the information stored in this tag, the tag is irradiated by multiple RF frequency radiation. As indicated above, short pulse based radiation can be used. Alternatively, scanning of the frequency range covered by all the elements can be used.

According to the invention, diffraction pattern formed from the diffraction elements (120 or 1120) define symbols in a data information code ("language"). Such language, based on these symbols, is formed from "words" based on a combination of the symbols. The number of the words (i.e., the number of possibilities to form a word) in the language depends on the length of the words, i.e. on the number of the symbols in the word. For example, the number of the words having 96 symbols (information bits) equals $2^{96}$ in the language having the binary basis (i.e. the alphabet consisting of two symbols: "0" and "1"). In other words, there are $2^{96} \approx 7.9 \times 10^{28}$ possibilities to form a word having the length of 96 symbols.

It can be understood that the same order of the number of the words, albeit having a shorter length, can be achieved by using a language having more additional symbols in its alphabet. For example, the language based on the alphabet having 22 symbols (bits) with the length of the words of 21 symbols has the number of possibilities to form a word equal to $22^{21}$ (i.e., $\approx 1.5 \times 10^{28}$ words).

Hence, each diffraction element 120 (or 1120) in the set of the elements in the data carrier 100 (or 1000) represents an information bit. The maximal number of such elements (bits) for a given data carrier is defined by the size of the data carrier and the size of the elements, as well as by the RF frequency (or frequencies) predefined to be used for reading information in this tag.

For example, for a square label having a side length of 10 cm, in millimeter wave radiation, the maximal number of recordable symbols is 10000 symbols, while in centimeter wave radiation, up to 100 symbols can be recorded. By the same token, a two-centimeter wavelength can provide for 25 symbols in a 10 cm length label. For example, in order to record the equivalent of 96 bits and to operate in the RF frequency range, the dimension of the data carrier can be slightly larger than 10 centimeter.

As indicated above, the data carrier of the present invention is in the form of a substrate layer patterned to have spaced-apart regions of material(s) having RF responsiveness properties (absorption, reflection, scattering) different from that of the substrate material. The substrate layer 11 of the data carrier can be made of a material transparent to the RF electromagnetic radiation. Examples of these materials include, but are not limited to, paper, fabric and plastic. The diffraction elements (12, 120 or 1120) can be fabricated by printing. A printer may for example be an ink jet printer. The ink used in such a printer can be made of a material that is capable of absorbing, scattering or reflecting the RF radiation. The diffraction elements (shaded zones in FIGS. 1B and 1C) are formed by material that can absorb, scatter or reflect the RF radiation, for example, metal (as a reflective material), conductive material formed by particles having dimension of the order of the RF wavelength (for scattering RF radiation), polymer-containing material (for absorbing RF radiation).

It should be appreciated that the diffraction elements can be printed directly on the substrate layer, e.g. paper or plastic material, to form self-support carriers. Alternatively, the diffraction elements can be incorporated into the structure of an article with which the data carrier is to be associated. Thus, a data carrier may be formed in situ with the article in question by applying the diffraction elements to the surface of the article, or by embedding the diffraction elements within the body of the article.

Figure 3A:
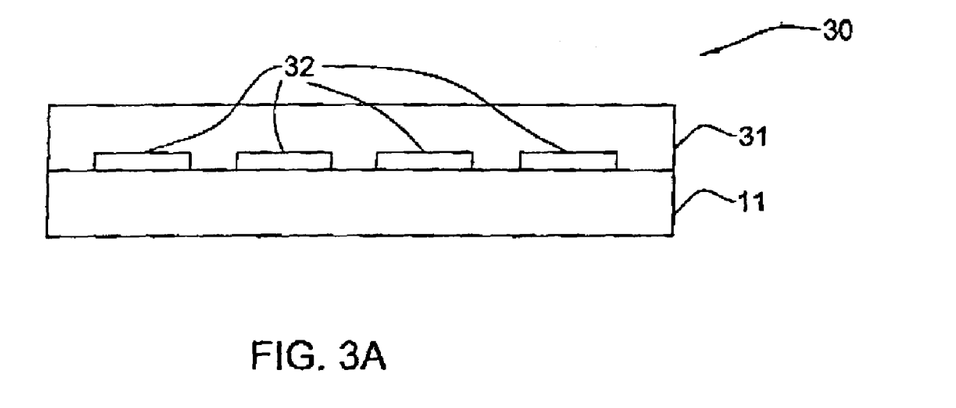
FIGS. 3A to 3C are schematic views in cross-section of data carriers according to three more embodiments of the invention, respectively.

Referring to FIG. 3A, a schematic view in cross-section of a multi-bit data carrier 30 is illustrated in accordance with another embodiment of the invention. The multi-bit data carrier 30 is distinguished from the above-described data carriers in that it includes a cover layer 31 disposed over the diffraction elements 32 (which can be designed as described above). The layer 31 is opaque (or black) for visible light while being transparent or permeable for RF spectrum, and therefore invisible to the human naked eye. The data marking defined by the diffraction elements is thus camouflaged from the counterfeiter by the apparently opaque layer 31 in such a way that it is not recognizable visually and can be detectable only through appropriate detecting devices.

Figure 3B:
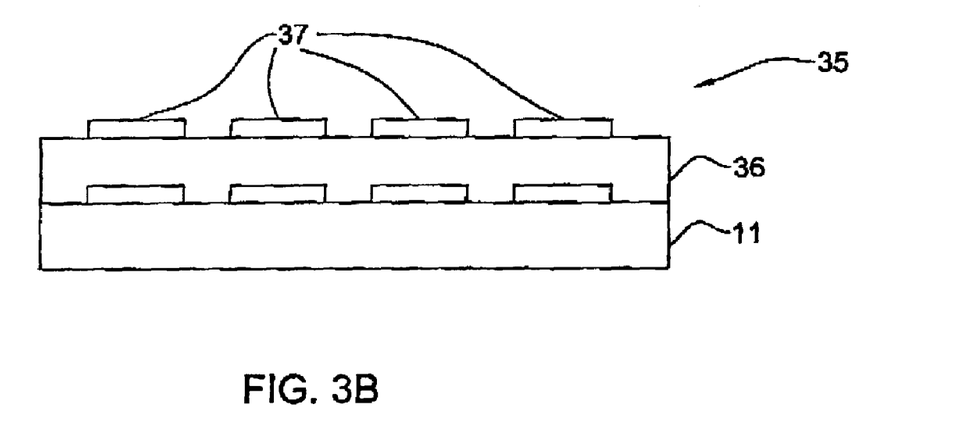

Referring to FIG. 3B, a schematic view in cross-section of a data carrier 35 (e.g., multi-bit data carrier) in accordance with still another embodiment of the invention is illustrated. The data carrier 35 further includes an additional substrate, layer 36 on which a set of additional diffraction elements 37 is aged. It should be appreciated that such a data carrier with a double substrate layer (or when required a multi substrate layer) provides for increasing the capacity of the stored data. According to this embodiment, the upper substrate layer 36 is made of a material, which is impermeable to the RF radiation of a first predetermined wavelength band, while being transparent to a second predetermined RF wavelength band. On the other hand, the lower substrate layer 11 is made of a material, which is impermeable to the RF radiation of the second predetermined wavelength band, while transparent to the RF radiation of the first predetermined wavelength band. Such combinations of substrate layers and diffraction elements can be applied to multiple layer data carriers.

Figure 3C:
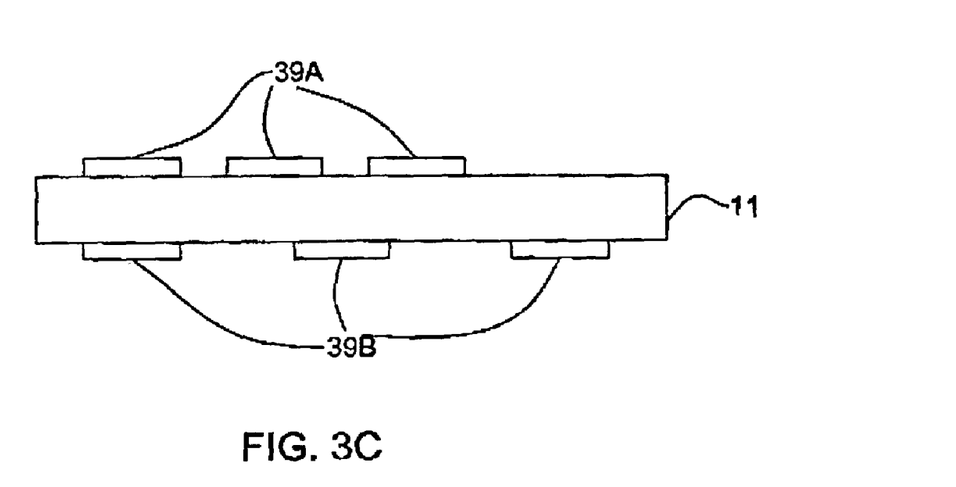

FIG. 3C illustrates a data carrier 38 having two sets of diffraction element 39A and 39B (e.g., each in the form of multiple diffraction elements). Here, in distinction to the example of FIG. 3B, the sets 39A and 39B are located on the opposite surfaces of the common substrate layer 11.

Figure 4A:
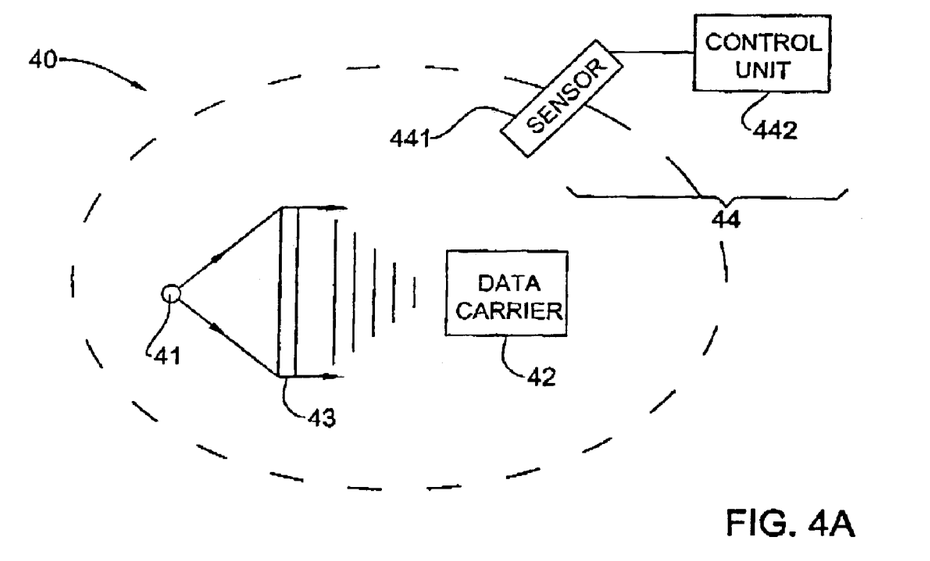
FIGS. 4A and 4B show an outline of two examples of an identification system according to the invention.
Figure 4B:
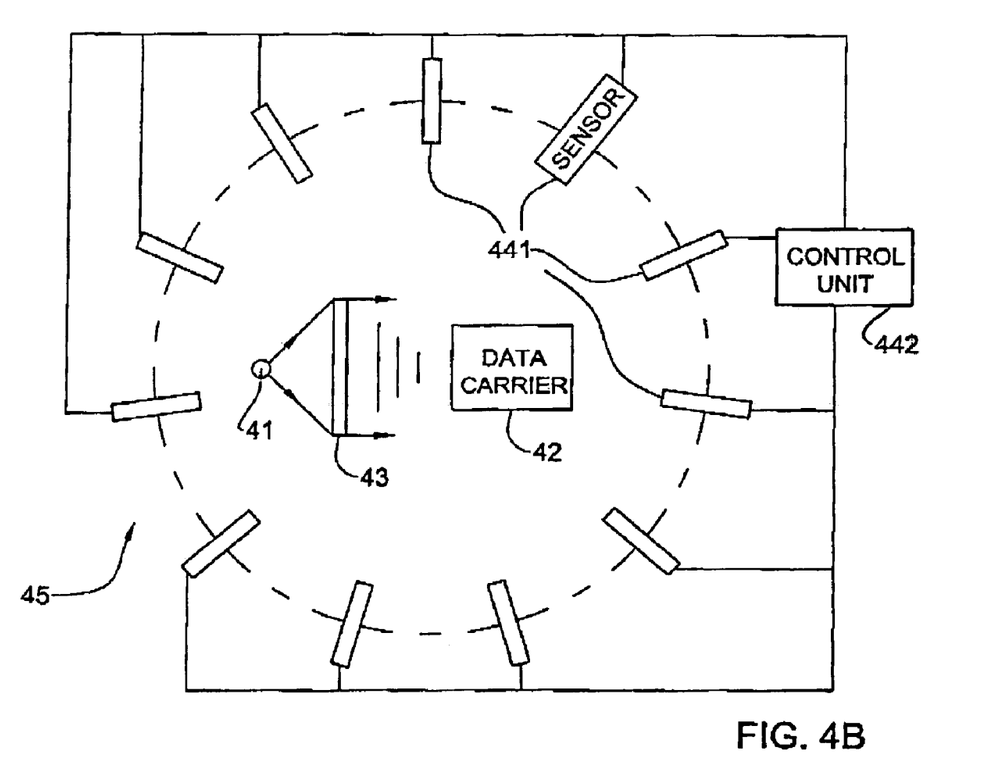

Referring to FIG. 4A and FIG. 4B, schematic views of an RF identification/authentication system for reading information stored in the data carrier of the present invention are illustrated, according to two different examples of the invention. It should be noted that the blocks in FIG. 4A and FIG. 4B are intended as functional entities only, such that the functional relationships between the entities are shown, rather than any physical connections and/or physical relationships.

The system 40 shown in FIG. 4A includes an RF radiation source 41, a collimating assembly 43 (the provision of which is preferred, but generally optional) located between the RF radiation source 41 and the RF data carrier 42, and a detector 44. The RF radiation source 41 is configured for generating RF electromagnetic radiation, and may for example, include a resonance circuit (coil and capacitor). The collimating element 43 can be a device of any known suitable reflective type, for example, Cassegrain arrangement, or refractive type (e.g., lens arrangement). The detector 44 includes a sensor 441 responsive to the diffraction patterns produced by diffraction elements (not shown) arranged on the RF data carrier 42. The sensor 441 may be of the point-like type, namely, including a single detecting element or may be the so-called "area detector" including a matrix of detecting elements. It should also be understood that the sensor may include an appropriate optical arrangement. Further provided in the system 40 is a control unit 442 connectable to the sensor 441 and configured for converting the output of the sensor indicative of the diffraction patterns into the corresponding information code. The system 40 may be associated with a means for providing a relative displacement (rotation or movement along a desired trajectory) between the sensor 441 (and possibly also the radiation source), and the RF data carrier 42, thereby enabling reading the diffraction patterns at multiple predetermined angles from multiple views around the carrier 42. It should be appreciated that the trajectory of movement can be such that the sensor 441 is located with respect to the data carrier to detect either radiation returned (reflected or scattered) from the data carrier or radiation transmitted through the data carrier, depending on the material forming the diffraction elements.

The sensor 441 may include any known suitable electronic RF measuring device (such as a magnetoresistor, e.g., semiconductor based structure) designed to be responsive to the diffraction pattern to generate an electrical output indicative thereof. The complexity of the sensor depends upon a specific application and the number of codes generated by the system. The converting of data indicative of the diffraction patterns utilizes an appropriate image recognition algorithm (pattern recognition) establishing a relationship between the diffraction patterns and symbols of the information code. It should be understood that the image processing technique does not need the straight forward reading (as that required for reading the barcodes), but utilizes logical filtering of the received RF pattern consisting of searching for a specific filter within the received pattern. Since there is a great variety of possible types of the diffraction elements and their combinations, the sensor can be specifically preprogrammed with an algorithm that allows reading a series of tags. Thus, tags may be designed for a range of applications. The person versed in this art should understand that the number of possible algorithms is almost limitless.

FIG. 4B illustrates another example of a system 45 for reading data stored in the data carrier of the present invention. The system 45 distinguished from the system 40 in that its detector 44 includes a plurality of sensors 441, all coupled to the control unit 442. According to this example, the sensors 441 are mounted around the data carrier, and are configured for sensing the diffraction patterns coming from the data carrier 42.

It should be understood the above-described configurations of the source/sensor(s) arrangements provide for three-dimensional scanning (observation) of the data carrier containing site.

Figure 5A:
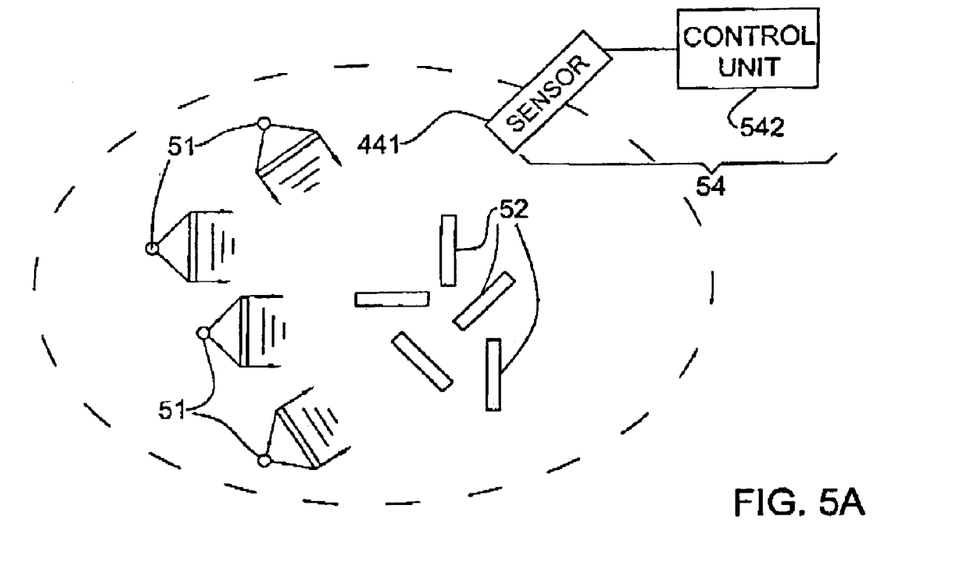
FIGS. 5A and 5B show an outline of two examples of a system for simultaneously reading the data stored in a plurality of data carriers of the present invention.
Figure 5B:
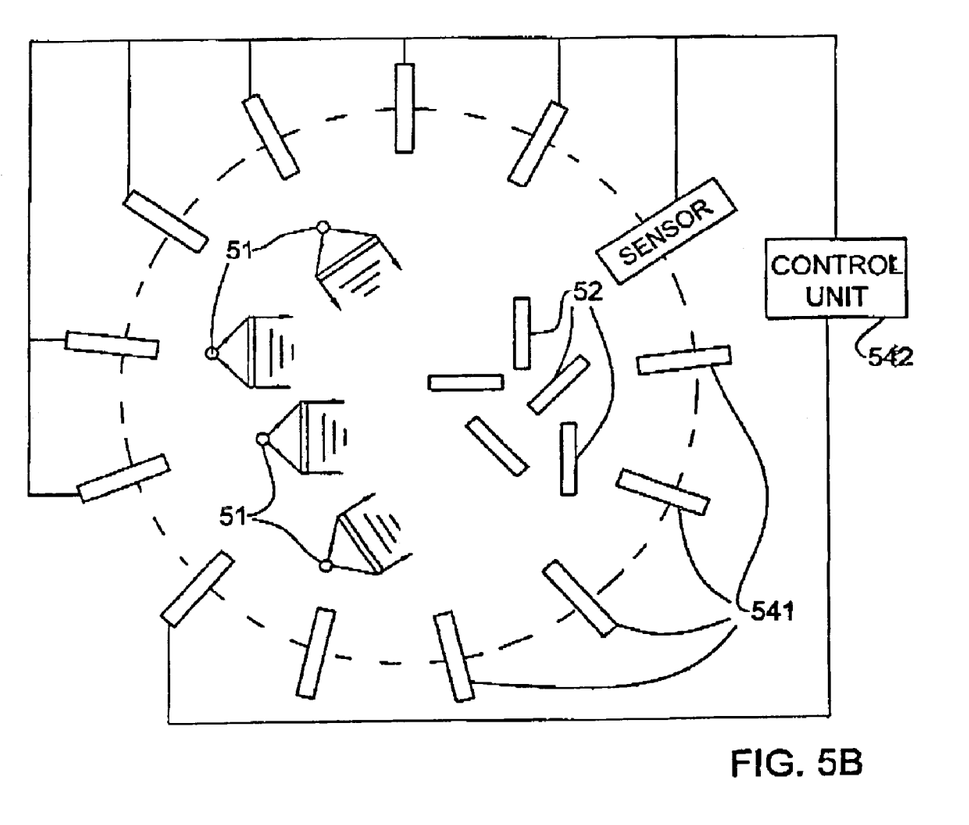

Referring to FIG. 5A and FIG. 5B, two more examples of a system for simultaneous reading data stored in a plurality of the data carriers 52 of the present invention are illustrated. The blocks in FIG. 5A and FIG. 5B are intended as functional entities only, such that the functional relationships between the entities are shown, rather than any physical connections and/or physical relationships.

The system shown in FIG. 5A includes a plurality of RF radiation sources 51 arranged around the data carriers 52 and configured to irradiate them with the RF radiation. Preferably, the sources are sequentially operated. The system further comprises a detector 54, which in the present example includes a sensor 541 (consistent with the sensor 441 shown in FIG. 4A) mounted for rotation around the plurality of the data carriers 52, and a control unit 542. Alternatively or additionally, the data carriers can be displaceable with respect to the fixed sensor 541. The example of the system shown in FIG. 5B, is distinguished from the example shown in FIG. 5A in that the detector 54 includes a plurality of sensors 541 coupled to the control unit 542. Owing to the fact that radiation responses (diffraction patterns) of the diffraction elements associated with the data carries 52 of the present invention have an angular structure (each pattern defining a symbol of a predetermined information code), the plurality of the data carriers can be read, while one being "hidden" by the other. The technique of reading multiple data carriers of the present invention may utilize the so-called Z-axis displacement (zoom) between the sensor and the data carriers' containing site, taking advantage of the fact that the angular distribution can be used to resolve the position of each tag with respect to one another, thereby enabling identification of a specific tag from all the other tags. The same affect can alternatively be achieved by scanning the RF frequency range. All the RF radiation sources 51 can be operable to radiate the RF radiation of the same wavelength or at least some of the RF radiation sources 51 are operable to generate the RF radiation of different wavelength, respectively, depending on the data carriers considered.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It is apparent that although the data carrier, identification system and method of reading thereof were described in terms of a multi-bit data carrier, the invention can be easily adapted for an article surveillance label. The label can carry only single diffraction element (i.e. one bit of information), and may be utilized, for example, for detecting the presence of the labels on or in an article. The surveillance label can be used in retail or library environments to deter theft or any other unauthorized removal of articles. In particular, the labels can be attached to articles designated to either be purchased or borrowed, and will trigger an alarm if carried without authorization through interrogation zones equipped with the corresponding system for reading the label. The data carriers of the present invention may also be used for article authentication. In this connection, the possibility of making the diffraction element pattern invisible is very important.

Also, it is to be understood that the phraseology and terminology employed herein are for the purpose of description and should not be regarded as limiting.

It is important, therefore, that the scope of the invention is not construed as being limited by the illustrative embodiments set forth here. Other variations are possible within the scope of the present invention as defined in the appended claims and their equivalents.

What is claimed is:

1. A radio frequency (RF) data carrier comprising at least one diffraction element, having a dimension of the order of a wavelength of RF radiation and being responsive to RF irradiation to produce a response in a form of a diffraction pattern, said diffraction pattern being indicative of machine-readable data carried by the data carrier.

2. The RF data carrier of claim 1 comprising a collection of the diffraction elements capable to produce a collection of diffraction patterns in response to irradiation with RF radiation, each pattern defining a symbol of a predetermined information code.

3. The RF data carrier of claim 1 wherein said diffraction elements are different from each other in either a shape or dimension, thereby enabling identification of the diffraction pattern of one element from those of the other elements.

4. The RF data carrier of claim 1 wherein dimension of said diffraction element is above 0.1 mm.

5. The RF data carrier of claim 1 wherein the at least one diffraction elements is deposited on a substrate surface.

6. The RF data carrier of claim 5, where said at least one diffraction element is deposited onto the substrate surface by printing.

7. The RF data carrier of claim 5 comprising at least one additional substrate surface on which at least one additional diffraction element is located, said at least one additional diffraction element having a dimension of the order of a wavelength of RF radiation.

8. The RF data carrier of claim 7, wherein the two substrate surfaces are the opposite surfaces of a common substrate layer.

9. The RF data carrier of claim 7 wherein said substrate layer is made of a material which is impermeable to the RF radiation of a first predetermined wavelength band, while being transparent to a second predetermined wavelength band of the RF spectrum.

10. The RF data carrier of claim 9 wherein said interference pattern is printed on a substrate layer.

11. The RF data carrier of claim 1 wherein said at least one diffraction element is incorporated into the structure of an article with which the data carrier is associated.

12. The RF data carrier of claim 1 wherein said at least one diffraction element is made of a material capable of absorbing, scattering or reflecting the RF radiation.

13. The RF data carrier of claim 1 comprising a layer opaque to visible light and disposed over all the diffraction elements in the data carrier.

14. The RF data carrier of claim 1 wherein the diffraction element is an interference pattern of RF radiation.

15. The RF data carrier of claim 14 wherein said interference pattern is created by computer-generated holography based technique.

16. A radio frequency (RF) data carrier comprising at least one diffraction element having a dimension of the order of a wavelength of RF radiation and producing a response to RF irradiation in a form of a diffraction pattern indicative of machine-readable data stored in the data carrier, said RF data carrier being manufactured by printing said at least one diffraction elements into a substrate.

17. A radio frequency (RF) data carrier comprising a set of diffraction elements each having a dimension of the order of a wavelength of RF radiation and being responsive to RF irradiation to produce a response in the form of diffraction pattern indicative of machine-readable data present a code of information stored in the data carrier.

18. A system for reading data in at least one RF data carrier, which comprises at least one diffraction element having a dimension of the order of a wavelength of RF electromagnetic radiation and producing a response to RF radiation in a form of a diffraction pattern indicative of data stored in the data carrier, the system comprising:
- at least one RF radiation source for generating RF radiation to irradiate the RF data carrier; and
- a detector responsive to diffraction patterns produced by the diffraction elements for generating signals indicative of the diffraction patterns to be converted into corresponding information codes.

19. The system of claim 18 wherein said detector includes at least one sensor configured for receiving RF radiation and generating a signal indicative thereof, connectable to a control unit configured for processing said signal to covert it into the corresponding information code.

20. The system of claim 19, wherein said sensor is an area sensor including an array of sensing elements.

21. The system of claim 19 wherein at least one of the sensor, RF radiation source and data carrier is mounted for movement with respect to the other.

22. The system of claim 19 comprising at least one collimating element located in a path of the RF radiation propagating from the RF radiation source, or in a path of the RF response propagating towards the sensor.

23. The system of claim 18 wherein said detector includes a plurality of sensors mounted around a location where the RF data carrier is to be placed when being read.

24. A method of red data stored in at least one RF data carrier, which comprises at least one diffraction element having a dimension of the order of a wavelength of RF radiation in a form of a diffraction pattern producing a response to RF radiation indicative of an information code stored in the data carrier, the method comprising:
(i) irradiating the data carrier with the RF radiation, thereby producing said response in the form of diffraction patterns;
(ii) sensing said diffraction patterns and generating signals indicative thereof; and
(iii) converting said signals into corresponding information code, thereby determining said data from the diffraction patterns.

25. The method of claim 24 wherein the sensing of said diffraction patterns is carried out while moving a sensor in a desired trajectory relative to the RF data carrier.

26. The method of claim 24 wherein the sensing of said diffraction patterns is carried out by a plurality of sensors arranged around the RF data carrier.

27. The method of claim 24 wherein said irradiating comprises varying the frequency of the RF radiation.

28. The method of claim 24 wherein said irradiating comprises generating broadband pulses of the RF radiation.

29. A method of simultaneously reading data stored in a plurality of RF data carriers, each comprising at least one diffraction element having a dimension of the order of a wavelength of RF radiation and producing a response to the RF radiation in the form of a diffraction pattern indicative of a symbol of an information code, the method comprising:
(i) simultaneously irradiating the RF data carriers with the RF radiation to produce the diffraction patterns;
(ii) sensing said diffraction patterns and generating signals indicative thereof; and
(iii) converting said signals into the corresponding information code, thereby determining said data from said diffraction patterns.

30. The method of claim 29, comprising providing a relative displacement between a sensor of the diffraction patterns and an RF data carriers' containing site.

31. The method of claim 30, wherein said displacement is rotation of the sensor or the RF data carriers' containing site with respect to one another.

32. The method of claim 31, wherein said displacement is a movement of the RF data carriers' containing site towards and away from the sensor.

33. The method of claim 30, wherein said displacement is a movement of the sensor towards and away from the RF data carriers' containing site.

34. The method of claim 30, wherein said irradiation comprises varying the frequency of the RF radiation.

35. The method of claim 29, wherein said irradiation comprises varying the frequency of the RF radiation.

36. The method of claim 29, wherein said sensing is carried out by a plurality of sensors accommodated around an RF data carriers' containing site.

37. The method of claim 29, comprising scanning an RF data carriers' containing site.

38. The method of claim 29, wherein said simultaneous irradiation of the RF data carriers comprises sequentially operating a plurality of RF sources to transmit RF radiation.

* * * * *